United States Patent Office 3,145,198
Patented Aug. 18, 1964

3,145,198
PROCESS FOR THE PURIFICATION OF
CAPROLACTAM
Giuseppe Morbidelli, Como, and Luciano Arosio, Lissone, Italy, and Luigi Notarbartolo, deceased, late of Milan, Italy, by Enza Pascalino, administratrix, and Paola Notarbartolo, heiress, both of Milan, Italy, assignors to Snia Viscosa Società Nazionale Industria Applicazioni Viscosa S.p.A., Milan, Italy, a company of Italy
No Drawing. Filed Aug. 21, 1962, Ser. No. 218,808
Claims priority, application, Italy, Aug. 30, 1961,
Patent 655,594
10 Claims. (Cl. 260—239.3)

The object of the present invention is a process for the purification of crude caprolactam. It is particularly applicable to crude caprolactam obtained by nitrosation of cyclohexyl compounds containing a tertiary carbon atom, in particular of hexahydrobenzoic acid or one of its functional derivatives, as described in Patent No. 3,022,291, granted Feb. 20, 1962, assigned to the assignee of the present application.

According to the invention, crude caprolactam is subjected to a treatment consisting of the following essential steps: at least one alkaline treatment, at least one distillation, one reduction and one oxidation. It is preferable to carry out other intermediate treatments and operations, as will be better shown by a more detailed description of the process in one of its preferred forms.

Preferably, then, the crude product is dissolved in water. The final concentration of the solution varies between 5 and 95% and is preferably around 85% (all percentages in the present specification are by weight).

The solution is subsequently subjected to a first alkaline treatment with a suitable base, in particular, lime or, also, sodium hydroxide or potassium hydroxide.

The alkaline treatment is continued until the pH of the solution reaches a value comprised between 8 and 13, preferably around 12. The operation is preferably carried out at a temperature of about 40° C. or, at any rate, between 20° and 90° C.

If insoluble salts are formed in the preceding treatment, or if solids are present for any reason, the solution is filtered, preferably hot (at a temperature between 30° and 100° C.).

Water is removed from the filtered solution by evaporation under vacuum. This operation yields relatively impure caprolactam, which is subjected to a first distillation. The distillation residue may be recovered, filtered if necessary, and then reused, preferably in the neutralization of the acid solution resulting from the nitrosation of the cyclohexyl compound, i.e., in the step in which caprolactam was formed and which precedes the isolation of crude caprolactam.

The lactam obtained from the first distillation—hereinafter called semi-crude—is redissolved in distilled water to a concentration comprised between 5 and 95% and preferably of 85%. Solutions recovered from other phases of the process may be used for the preparation of this solution.

The solution of the semi-crude lactam is subjected to a reducing treatment. This treatment may be effected with any suitable agent, for example, by the use of nascent hydrogen obtained by reacting an acid with iron, or by treatment with hydrogen in the presence of a suitable hydrogenation catalyst such as, for example, supported nickel.

At the end of the reduction, the mixture is filtered, if this is necessary or desirable.

The reduction of the semi-crude lactam can be effected in the molten state, in the presence of a hydrogenation catalyst, or in other ways known in the hydrogenation art. If it is carried out in the molten state, it may be desirable to add water to the hydrogenated product prior to separating the catalyst, to facilitate its separation. In this case, an aqueous solution of hydrogenated semi-crude lactam, in the concentrations stated hereinbefore, will be available for the subsequent treatments.

Subsequently, the mixture is preferably treated with cation exchange resins. Various commercial cation exchange resins are suitable for this purpose. The solution is passed over the resin until the desired pH, which must be comprised between 2 and 6.5 and is preferably about 5.5–6, is attained. The temperature is comprised between 20° and 90° C., and is preferably 30° C. At the end of the operation, the resin is preferably washed to recover the lactam it contains. The washings are recovered and preferably used for the dilution, for example, of semi-crude lactam. The resin may be regenerated by treatment with sulfuric acid.

The solution is subsequently subjected to an oxidizing treatment. It has been found particularly advantageous to carry out this treatment with potassium permanganate or $H_2O_2$, at temperatures between 10° and 100° C., preferably at about 20° C.

A second alkaline treatment is then effected until a pH comprised between 8 and 13, preferably of about 12, is obtained, this treatment being otherwise similar to the first alkaline treatment described. Thus, any suitable base such as lime or sodium hydroxide may be used.

At this point, it is usually necessary to carry out a filtration to remove salts, insoluble bases or other solid impurities. The filter cake obtained is washed with water, more than once if necessary; the lactam contained in the washings is recovered, preferably by using them for the dilution of crude lactam.

The solution is again subjected to evaporation under vacuum; semi-pure caprolactam is obtained which, subjected to a final distillation, yields pure caprolactam.

The distillation is preferably carried out by fractionation in a column equivalent to 10 plates, with a 4:1 reflux. Only the tail fraction is separated.

If certain steps of the purification cycle, for example the oxidizing treatment, are omitted, the forerun must also be separated, with a reflux of 20:1.

Certain types of crude starting material require only a normal vacuum distillation without fractionation of the forerun and tail fraction.

The distillation residue may be recycled, for example, by combining it with semi-crude lactam.

The characteristics of the resulting pure lactam are excellent.

The order of the above-described operations is not necessarily critical and the order of some of them may be inverted. In particular, the reduction may precede the first alkaline treatment, and the order in which oxidation and the second alkaline treatment are carried out may be inverted.

Depending on the original lactam composition, it may also be possible to omit some of the operations.

The following example will serve to illustrate but not limit the practice of the invention.

In the practical example to be described, crude caprolactam, produced according to the following method, illustrated in Patent No. 3,022,291, mentioned, was used.

A 500-cc. flask, fitted with agitator, thermometer, reflux condenser and dropping funnel, is charged with 117 g. of hexahydrobenzoic acid, and 80 g. of cyclohexane. The mass is heated to 78° C. At this point, dropwise addition of a mixture, prepared from 135 g. of $NOHSO_4$, 82.2 g. of 23% oleum and previously heated at 130° C. for 1 hour with agitation, and then cooled, is started. The addition of the mixture to hexahydrobenzoic acid is adjusted so as to produce a continuous and regular evolution of $CO_2$ and to maintain a reaction temperature of 74–75° C. The addition of the mixture is completed in 40 min., and the reaction continues exothermically for an additional 10 min. The mixture is heated at 74° C. for an additional 10 min., until the evolution of $CO_2$ has subsided.

The product is allowed to cool. It is then dissolved in cold water, cyclohexane is separated, and the mixture is treated, for example, as follows. It is poured on ice and extracted with ether, and the two layers thus obtained, an aqueous and an ether layer, are separated by decantation. The aqueous layer is neutralized, first with 40% sodium hydroxide and then with 10% sodium carbonate solution, until a pH of 7 is obtained. It is then completely extracted with chloroform. Drying and evaporating the solvent yields 45.9 g. of lactam; 57 g. of hexahydrobenzoic acid is recovered of which 49.7 g. as residue after the evaporation of cyclohexane. Taking into account the quantity of hexahydrobenzoic acid recovered, the yield of caprolactam is 86.5% of the theoretical.

An 85% by weight solution in purified water is prepared from 1000 g. of crude lactam obtained as described above and containing 962 g. of lactam. To facilitate dissolution, the solution is heated to 40–50° C., a temperature at which the next treatment is carried out.

The solution is neutralized by an alkaline treatment consisting of the addition of 30 g. of CaO. Before its addition to the solution, CaO is partially hydrated with a small amount of water to produce a granular, more easily filtrable product. The pH of the solution is 12. The operation is carried out at 40° C.

The solution is filtered to remove CaO in excess, the Ca salts formed and possibly present solid impurities stemming from the starting lactam solution. The filter cake is slurred in and washed several times with water, to recover the lactam it contains. The washings are added to the filtered solution.

The alkaline treatment may be carried out by using in place of CaO, as described above, a corresponding quantity of NaOH or KOH.

Water is then evaporated from the aqueous lactam solution under vacuum, and the lactam is vacuum-distilled (pressure beyond the condenser: 3 mm. Hg; pressure in distillation flask: 5 mm. Hg; vapor temperature: 116° C.).

This first distillation yields 920 g. of semi-crude lactam (yield: 92.0% based on crude; 95.8% based on lactam contained in crude).

The distillation residue contains about 40% of lactam which may be recovered by reusing the filtered residue in the neutralization of the acid solution resulting from the nitrosation step, preceding the isolation of crude caprolactam, as described with regard to the preparation of the latter.

An 85% by weight solution of distilled semi-crude lactam in distilled water is prepared. Dissolution is facilitated by heating to 40–50° C.

The solution is subjected to a reduced treatment. For this purpose, 0.5% of $H_2SO_4$ is added to the solution, which is then reacted with granular iron.

The reaction is carried out in a beaker at a temperature of 60° C. with adequate agitation. The reaction is completed when the pH is 6.5.

Instead of using the above-described method, it is possible to carry out the reduction by adding to the solution 0.3% by weight of nickel catalyst, calculated as metal, based on the aqueous solution to be treated, and treating it with $H_2$ in an autoclave, at low pressure (1–2 atm.) and at 100° C.

The nickel catalyst consists of metallic nickel (25%) supported by a diatomaceous earth carrier. This catalyst is prepared by precipitating nickelous hydroxide onto diatomaceous earth with alkali and reducing it to metal at 400° C. in a stream of $H_2$.

In lieu of adding water to the semi-crude caprolactam prior to hydrogenation, the hydrogenation can be carried out as follows. The semi-crude lactam (920 gr.) is introduced into an autoclave. A palladium catalyst on a carbon support (containing 5% by weight of the metal) is added. The amount of catalyst is 0.5–1% by weight based on the semi-crude lactam. The autoclave is filled with hydrogen at room temperature to a pressure of 1 atmosphere, and is then heated to 130° C. for one hour. After the termination of the reaction, water is added to produce an aqueous solution having a concentration of 85% by weight of hydrogenated semi-crude caprolactam.

Following reduction, no matter how effected, the solution is filtered to remove possibly present $FeSO_4$ or the catalyst used.

The filter cake is washed with water to recover the lactam it contains, and the washings are added to the filtered solution.

The filtered solution is treated with 40 g. of Dusa-Reit S cationic exchange resin, activated with $H_2SO_4$, so that the pH of the solution itself is brought to 5.5.

The operation is carried out in a beaker at 30° C. with agitation. The resin is filtered off and washed with water to recover the lactam. The washings are combined with the solution.

The solution is subjected to an oxidizing treatment by adding to it 9 g. of $KMnO_4$ and agitating until the purple color disappears (at room temperature).

A second alkaline treatment, analogous to the first one, is now applied. 3.6 g. of CaO is added to bring the pH of the solution to 12.

The operation is carried out at 40° C. The mixture is filtered to separate the excess of CaO, the Ca salts formed and manganic metahydroxide. The filter cake is slurried in and washed several times with water to recover the lactam it contains; the washings are added to the filtered solution.

In this step, too, CaO may be substituted by NaOH or KOH.

Water from the aqueous lactam solution is evaporated under vacuum, and the lactam is vacuum-distilled.

The vacuum distillation of the lactam is carried out with fractionation of the tail fraction. A column equivalent to 10 plates is used, and the reflux ratio is 4:1.

The feed is introduced at a point corresponding approximately to the lower third of the column height.

The pressure beyond the condenser is 1–3 mm. Hg and the vapor temperature 100–109° C.

879 g. of pure lactam is obtained (yield=87.9% based on crude used, 91.4% on the lactam contained in the crude used).

The analytical characteristics of the distilled lactam are:

Melting point _____° C___ 68.8
$KMnO_4$ number _____seconds___ 14,400

(solution used for comparison:

$0.3°/_{oo} CoCl_2.6H_2O + 2°/_{oo} CuSO_4.5H_2O$)

Color, A.P.H.A_____ 5
Acidity (phenolphthalein) _____ None
Volatile bases_____ None (After aging in the molten state for 72 hours at 90° C., exposed to air.)

Color, A.P.H.A_____ 5
Acidity (to phenolphthalein, expressed as acetic
  acid)_____percent__ 0.002

An example illustrating, but not limiting, the practice of the invention was described. It is clear that many variations of this example and, in general, of the described procedure are possible without departing from the scope of the invention. In particular, the processing details of each of the various steps may be changed, substantially equivalent materials may be used in place of those indicated, non-essential operations may be omitted or other operations may be added, or the order of the operations may be changed. In modifying or adapting the overall process described, a person versed in the art will also take into account the characteristics of the crude lactam starting material which may differ, with regard to composition and impurities, from that used in the example given. Also, the conditions and method of nitrosation may be varied, using the same starting compound. Evidently, a difference in composition of the crude lactam may allow or require a change in the purification method, without departing from the scope of the invention.

We claim:

1. A process for purifying crude caprolactam which has originated from an acid solution that has already undergone neutralization and extraction with an organic solvent, which comprises dissolving the crude caprolactam in water, treating the solution with an alkali, evaporating the so-treated solution and distilling it, dissolving the distillate in water, hydrogenating the solution, treating the hydrogenated solution with an ion exchange resin, oxidizing the so-treated solution, treating the oxidized solution with an alkali, and evaporating and distilling the solution to recover pure caprolactam.

2. A process for purifying crude caprolactam obtained by nitrosation in a sulfuric acid reaction medium of a cyclohexyl compound containing a tertiary carbon atom, which comprises dissolving the crude caprolactam in water, subjecting the solution first to hydrogenation and then to oxidation and to two alkali treatments, and distilling the solution after all the treatments, one of the two alkali treatments occurring between hydrogenation and oxidation.

3. A process as claimed in claim 2, wherein hydrogenation precedes the first alkali treatment.

4. A process as claimed in claim 2, wherein oxidation precedes the second alkali treatment.

5. A process as claimed in claim 2, wherein hydrogenation follows the first alkali treatment, and oxidation follows the second treatment with an alkali.

6. A process as claimed in claim 3, wherein the crude caprolactam is subjected to treatment with an ion exchange resin after hydrogenation.

7. A process as claimed in claim 4, wherein the crude caprolactam is subjected to treatment with an ion exchange resin prior to oxidation.

8. A process as claimed in claim 5, wherein the crude caprolactam is subjected to treatment with an ion exchange resin after hydrogenation but prior to oxidation.

9. A process for purifying crude caprolactam obtained by nitrosation in a sulfuric acid reaction medium of a cyclohexyl compound containing a tertiary carbon atom, which comprises dissolving the crude caprolactam in water, and transforming the crude caprolactam to semi-crude caprolactam by treating the solution with an alkali, distilling the so-treated solution, dissolving the distillate in water, hydrogenating the solution, treating the hydrogenated solution with an ion exchange resin, oxidizing the so-treated solution, treating the oxidized solution with an alkali, and evaporating and distilling the solution to recover pure caprolactam.

10. A process for purifying crude caprolactam according to claim 9, wherein each alkaline treatment is continued until the pH of the solution reaches a value between 8 and 13 and is carried out at a temperature between 20° C. and 90° C., and the treatment with an ion exchange resin is effected at a temperature between 20° C. and 90° C. to obtain a pH between 2 and 6.5.

References Cited in the file of this patent

UNITED STATES PATENTS

| | | |
|---|---|---|
| 2,667,483 | Zeegers | Jan. 26, 1954 |
| 2,752,336 | Boon et al. | June 26, 1956 |
| 2,786,052 | Kampschmidt | Mar. 19, 1957 |
| 2,817,661 | Kampschmidt | Dec. 24, 1957 |
| 3,021,326 | Snider et al. | Feb. 13, 1962 |
| 3,022,291 | Muench et al. | Feb. 20, 1962 |
| 3,062,812 | Taylor | Nov. 6, 1962 |
| 3,090,739 | Ito | May 21, 1963 |